(12) United States Patent
Sorek et al.

(10) Patent No.: US 6,876,763 B2
(45) Date of Patent: Apr. 5, 2005

(54) IMAGE RESOLUTION IMPROVEMENT USING A COLOR MOSAIC SENSOR

(75) Inventors: Noam Sorek, Zichron Yaakov (IL); Ilia Vitsnudel, Even Yehuda (IL); Ron Fridental, Herzelia (IL)

(73) Assignee: ALST Technical Excellence Center, Kfar Saba (IL)

( * ) Notice: Subject to any disclaimer, the term of this patent is extended or adjusted under 35 U.S.C. 154(b) by 549 days.

(21) Appl. No.: 09/776,377

(22) Filed: Feb. 2, 2001

(65) Prior Publication Data

US 2002/0008715 A1 Jan. 24, 2002

Related U.S. Application Data

(60) Provisional application No. 60/179,954, filed on Feb. 3, 2000.

(51) Int. Cl.$^7$ ................................................. G06K 9/00
(52) U.S. Cl. .................. 382/162; 382/167; 382/173; 382/182; 382/190; 382/202; 382/237; 382/299; 348/222.1; 348/277; 358/464
(58) Field of Search .................. 382/154, 162, 382/164, 173, 176, 177, 181–185, 190, 202, 237, 299; 345/698; 348/272, 273, 277, 280, 222.1; 358/453, 464, 467, 538

(56) References Cited

U.S. PATENT DOCUMENTS

| | | | | |
|---|---|---|---|---|
| 5,848,185 A | * | 12/1998 | Koga et al. | 382/173 |
| 5,852,468 A | * | 12/1998 | Okada | 348/272 |
| 5,929,866 A | * | 7/1999 | Arnold | 345/471 |
| 5,969,756 A | * | 10/1999 | Buckley et al. | 348/190 |
| 6,347,156 B1 | * | 2/2002 | Kamada et al. | 382/237 |
| 6,366,696 B1 | * | 4/2002 | Hertz et al. | 382/183 |
| 6,462,835 B1 | * | 10/2002 | Loushin et al. | 358/1.9 |

FOREIGN PATENT DOCUMENTS

| | | |
|---|---|---|
| EP | 0 729 278 A2 | 8/1996 |
| JP | 9-168157 | 6/1997 |
| JP | 11-262022 | 9/1999 |
| WO | WO 84/02990 | 8/1984 |
| WO | WO 99/24936 | 5/1999 |

OTHER PUBLICATIONS

Banham et al., "Digital Image Restoration," *IEEE Signal Processing Magazine*, Mar. 1997, pp. 24–43.
Lee, "Review of image–blur models in a photographic system using the principles of optics," *Optical Engineering*, 29(5), 405–421 (1990).
ST, "Vision & Imaging," product description for VV5500–VV6500 Multi Format Digital Output Sensor, pp. 1–4 (Sep. 2000).
U.S. Provisional application No. 60/179,954 filed Feb. 3, 2000, "Use of Color Camera for Printed and Hand–written Document Imaging, Based on Resolution Improvement of any Color Mosaic Sensor".

* cited by examiner

Primary Examiner—Bhavesh M. Mehta
Assistant Examiner—Yubin Hung
(74) Attorney, Agent, or Firm—Marshall, Gerstein & Borun LLP

(57) ABSTRACT

A method for electronic imaging, consisting of forming an image having a background color and a non-background color on a plurality of pixels in a color mosaic image sensor, and receiving from each of the plurality of pixels a respective initial signal responsive to the image. The method further includes determining the background color of the image responsive to the initial signals, determining the non-background color of the image responsive to the initial signals, and calculating an adjusted signal for each pixel of the plurality of pixels responsive to the initial signal of the pixel and to at least one of the background color and the non-background color.

22 Claims, 7 Drawing Sheets

IMAGE RESOLUTION IMPROVEMENT USING A COLOR MOSAIC SENSOR

CROSS-REFERENCE TO RELATED APPLICATIONS

This application claims the benefit of U.S. Provisional Patent Application No. 60/179,954 filed Feb. 3, 2000, which is incorporated herein by reference.

FIELD OF THE INVENTION

The present invention relates generally to imaging systems, and particularly to resolution improvement of an imaging system comprising a color mosaic sensor.

BACKGROUND OF THE INVENTION

Color image sensors comprise a mosaic of individual filters covering respective sensor pixels. The filters may be red, green and blue (RGB), or alternatively cyan, magenta, yellow and green (CMYG). After an image has been formed on the sensor, signals from adjacent pixels are combined so as to produce local color and intensity values for the image. Although high-quality video cameras use three sensors—one for each primary color—mosaic sensors are used in almost all mass-market video devices because of their low cost.

Figure 1:
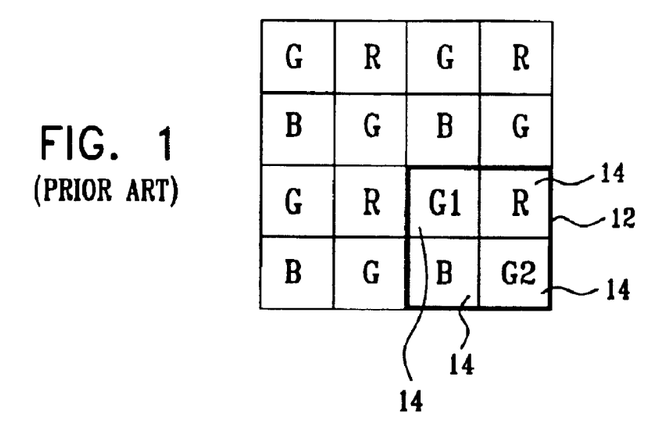
FIG. 1 is a schematic diagram of a color imaging sensor, as is known in the art.

FIG. 1 is a schematic diagram of a "Bayer-type" mosaic color imaging sensor, as is known in the art. A sensor of this type is the VV6500, produced by STMicroelectronics of Carrollton, Dallas, Tex. Color filters in the sensor are positioned on a rectangular grid, there being twice as many G filters as R and B filters. To generate an image of a region 12, signals from four pixels 14 comprising the region are combined to form a color signal having a luminance Y and a chrominance C of the region. Values of Y and C are calculated as functions, typically linear functions, of the signals from the individual pixels 14, i.e., $$Y = F1(R, B, G1, G2), \text{ and}$$
$$C = F2(R, B, G1, G2), \quad (1)$$

wherein R, B, G1, and G2 correspond to signals from their respective pixels, and F1 and F2 are functions.

It will be appreciated that the resolution of a color imaging sensor is less than that of a black and white imaging sensor with the same pixel pitch, since the color sensor averages adjacent pixels.

Figure 2:
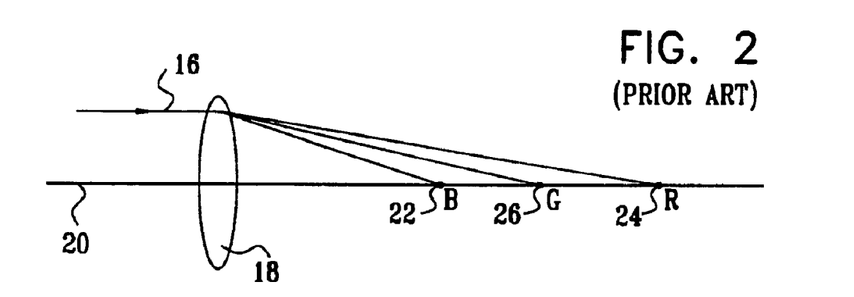
FIG. 2 is a first schematic diagram showing passage of light rays through a lens, as is known in the art.
Figure 3:
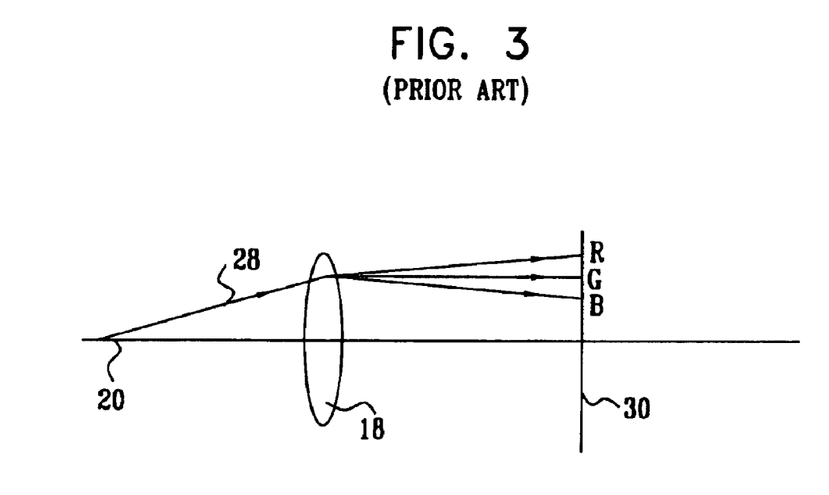
FIG. 3 is a second schematic diagram showing passage of light rays through a lens, as is known in the art.

FIGS. 2 and 3 are schematic diagrams showing passage of light rays through a lens, as is known in the art. FIG. 2 shows white light rays 16, parallel to an axis 20 of a lens 18, incident on the lens. Because of dispersion by the lens, which dispersion is an inherent characteristic of all practical lens systems, the parallel rays are refracted to different foci on axis 20, according to the wavelength, i.e., the color, of the dispersed light. Thus, a blue focus 22 is closer to lens 18 than a red focus 24, and a green focus 26 is intermediate between the red and blue foci. Chromatic distortions caused because the red, blue, and green foci do not coincide on the lens axis are termed axial color aberrations.

FIG. 3 shows a white ray 28, i.e., a ray that exits lens 14 (in the absence of aberrations) substantially parallel to axis 20, and which thus defines a height of an image produced at an image plane 30. As for parallel rays 16, ray 28 is dispersed into its constituent colors, so causing a chromatic distortion termed lateral color aberration at the image plane.

Other distortions when a lens forms an image are also known in the art. For example, a square object may be imaged with "barrel" or "pincushion" distortion. Also, each point on the object will typically be imaged, according to a point spread function depending on the lens, to a more or less blurred region of the image having an area larger than zero. Methods for correcting distortions of the types described above, which are typically not functions of the wavelength of the imaging light, are known in the art. Examples of methods for deblurring images are described in an article titled "Review of image-blur models in a photographic system using the principles of optics" by Hsien-Che Lee, in the May, 1990 issue of *Optical Engineering*, which is incorporated herein by reference. Examples of distortion correction are described in an article titled "Digital Image Restoration" by Banham et al., in the March 1997 issue of IEEE Signal Processing Magazine, which is incorporated herein by reference. The book titled "Digital Image Restoration" by H. C. Andrews and B. R. Hunt, published by Prentice-Hall of Englewood Cliffs, N.J. in 1977, describes general methods for restoration of distorted images.

SUMMARY OF THE INVENTION

It is an object of some aspects of the present invention to provide a system and apparatus for improving the resolution of images formed by a color mosaic sensor, particularly images of documents.

It is a further object of some aspects of the present invention to provide a system and apparatus for correction of aberrations generated in an imaging system.

It is a yet further object of some aspects of the present invention to provide a system and apparatus for increasing resolution of an imaging system.

In preferred embodiments of the present invention, an imaging system comprises a color mosaic sensor. An image is formed on the sensor, which comprises a plurality of pixels for sensing different colors, preferably red (R), green (G), and blue (B). In at least some regions of the sensor, the image formed is classifiable into substantially two colors, herein termed a background color and a non-background color. This binary color characteristic is typical particularly of documents. The image is analyzed by a central processing unit (CPU) coupled to the sensor in order to determine the background and non-background colors. Signals from each pixel of the sensor (R, G, and B) are then analyzed, and each pixel is re-assigned a color as a function of the background and non-background colors. The known color in each region of the image makes it possible to determine the luminance (Y) levels at each individual pixel, and to compare the luminance levels of adjoining pixels of different colors. Thus, the resolution of the image is enhanced significantly, compared to conventional mosaic sensor systems, in which luminance is determined only with respect to a group of pixels taken together.

In some preferred embodiments of the present invention, distortions generated within the imaging system are corrected by analyzing signals from each of the pixels of the sensor. The system is first calibrated with a known object. In operational use a corrected signal for each pixel of the sensor is generated by the CPU in terms of the calibration.

In some preferred embodiments of the present invention, the resolution of a region of the image is improved by analyzing signals from adjacent pixels in the region. The analysis is performed on the pixels after their colors have been re-assigned as described hereinabove, so as to generate an image in the region having sub-pixel resolution.

In some preferred embodiments of the present invention, optical character recognition (OCR) is applied to images comprising text. The OCR is applied after pixel colors have been reassigned and/or after sub-pixel resolution has been implemented.

There is therefore provided, according to a preferred embodiment of the present invention, a method for electronic imaging, including:

forming an image including a background color and a non-background color on a plurality of pixels in a color mosaic image sensor;

receiving from each of the plurality of pixels a respective initial signal responsive to the image;

determining the background color of the image responsive to the initial signals;

determining the non-background color of the image responsive to the initial signals; and calculating an adjusted signal for each pixel of the plurality of pixels responsive to the initial signal of the pixel and to at least one of the background color and the non-background color.

Preferably, the color mosaic sensor includes pixels of at least two specific colors, and determining the background color includes locating a background region of the image responsive to the initial signals of the pixels of at least one of the specific colors, and determining the non-background color includes locating a non-background region of the image responsive to the initial signals of the pixels of the at least one of the specific colors.

Preferably, determining the background color includes determining one or more background values responsive to the initial signals of the pixels of the at least two specific colors in the background region, and determining the non-background color includes determining one or more non-background values responsive to the initial signals of the pixels of the at least two specific colors in the non-background region.

Preferably, calculating the adjusted signal for each pixel includes determining the adjusted signal responsive to the one or more background values and the one or more non-background values.

Preferably, forming the image includes forming a calibration image on the color mosaic image sensor, and calculating the adjusted signal for each pixel includes determining one or more correction factors for the sensor responsive to the calibration image and calculating a corrected value for each pixel responsive to the one or more correction factors.

Preferably, calculating the adjusted signal for each pixel includes calculating a plurality of sub-pixel resolution signals for each pixel responsive to a level of the initial signal of the pixel.

Further preferably, calculating the plurality of sub-pixel resolution signals includes identifying one or more straight line segments within the image.

Preferably, calculating the adjusted signal for each pixel includes implementing a process of binarization of the image and utilizing the binarization to perform optical character recognition (OCR) on at least a portion of the image.

There is further provided, according to a preferred embodiment of the present invention, a method for electronic imaging, including:

forming an image including a first plurality of areas, each area including a respective background color and a respective non-background color, on a second plurality of pixels in a color mosaic image sensor;

receiving from each of the second plurality of pixels a respective initial signal responsive to the image;

determining which of the second plurality of pixels correspond to each area responsive to the background color and non-background color of each area;

determining for each area the respective background color of the image responsive to the initial signals;

determining for each area the respective non-background color of the image responsive to the initial signals; and calculating an adjusted signal for each pixel of the second plurality of pixels responsive to the initial signal of the pixel and to at least one of the first plurality of background colors and the first plurality of non-background colors.

There is further provided, according to a preferred embodiment of the present invention, apparatus for electronic imaging, including:

a color mosaic image sensor including a plurality of pixels, which are adapted to generate respective initial signals responsive to an image formed thereon; and a central processing unit (CPU), coupled to receive the respective initial signals from the plurality of pixels and, responsive to the initial signals, to determine a background color and a non-background color of the image and to calculate, for each of the plurality of pixels, an adjusted signal responsive to the initial signal and to at least one of the background color and the non-background color.

Preferably, the plurality of pixels include pixels of at least two specific colors, wherein the CPU locates a background region and a non-background region of the image responsive to the initial signals of the pixels of at least one of the specific colors.

Preferably, the CPU determines one or more background values responsive to the initial signals of the pixels of the at least two specific colors in the background region, and determines one or more non-background values responsive to the initial signals of the pixels of the at least two specific colors in the non-background region.

Preferably, the CPU determines the adjusted signal responsive to the one or more background values and the one or more non-background values.

Preferably, the apparatus includes a calibration grid which forms a calibration image on the color mosaic image sensor, wherein the CPU determines one or more correction factors for the sensor responsive to the calibration image and calculates a corrected value for each pixel responsive to the one or more correction factors.

Preferably, the CPU calculates a plurality of sub-pixel resolution signals for each pixel responsive to a level of the initial signal of the pixel.

Further preferably, the CPU determines one or more straight line segments within the image.

Preferably, the CPU implements a process of binarization of the image and utilizes the binarization to perform optical character recognition (OCR) on at least a portion of the image.

There is further provided, according to a preferred embodiment of the present invention, apparatus for electronic imaging, including:

a color mosaic image sensor including a first plurality of pixels, which are adapted to generate respective initial signals responsive to an image, including a second plurality of areas, each area including a respective background color and a respective non-background color, formed thereon; and a central processing unit (CPU), coupled to receive the respective initial signals from the first plurality of pixels and which is adapted, responsive to the initial signals, to determine which of the pixels correspond to each area responsive to the background color and non-background color of each area, to determine for each area a background color and a non-background color of the image, and to calculate, for each of the first plurality of pixels, an adjusted signal responsive to the initial signal and to at least one of the second plurality of background colors and the second plurality of non-background colors.

The present invention will be more fully understood from the following detailed description of the preferred embodiments thereof, taken together with the drawings, in which:

DETAILED DESCRIPTION OF PREFERRED EMBODIMENTS

Figure 4:
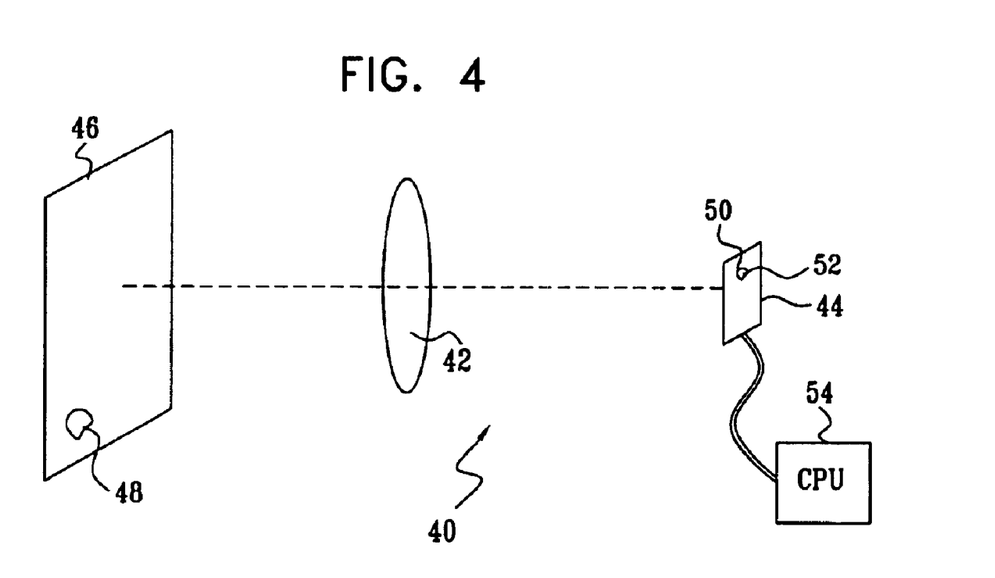
FIG. 4 is a schematic diagram of an imaging system, according to a preferred embodiment of the present invention.

Reference is now made to FIG. 4, which is a schematic diagram of an imaging system 40, according to a preferred embodiment of the present invention. Imaging system 40 comprises an imaging device 42 which forms an image of a document 46 on a color imaging sensor 44. System 40 also comprises a central processing unit (CPU) 54, most preferably any industry-standard CPU, which receives signals from sensor 44 and analyzes the signals, as described in detail hereinbelow. Sensor 44 comprises any industry-standard color mosaic sensor, such as the Bayer-type sensor described in the Background of the Invention. Device 42 comprises one or more optical elements known in the art, which are able to form separately or in combination an image of an object on sensor 44. Typically, device 42 comprises one or more simple or compound lenses, and/or one or more mirrors. Device 42 may be implemented from industry-standard elements, or custom-built elements, or a combination of industry-standard and custom-built elements.

As described in the Background of the Invention, a luminance Y and a chrominance C of a region 48 of document 46 are given by the equations:

$$Y = F1(R, B, G1, G2), \text{ and}$$

$$C = F2(R, B, G1, G2), \quad (1)$$

wherein R, B, G1, and G2 correspond to signals from pixels of sensor 44, generated by the image of region 48 on an area 50 of the sensor. If region 48 is assumed to be substantially of one known color, then substantially fixed ratios $$\alpha_B = \frac{B}{G}, \quad \alpha_R = \frac{R}{G} \quad (2)$$

will prevail in the region. Knowledge of values of $\alpha_B$ and $\alpha_R$ can be used to calculate a value of Y and C on a pixel-by-pixel basis. For example, if a specific red pixel 52 gives a signal $R_s$, then calculated values of a green signal $G_s$ and a blue signal $B_s$ at pixel 52 are given by, $$G_S = \frac{R_S}{\alpha_R}, \quad B_S = \frac{\alpha_B R_S}{\alpha_R} \quad (3)$$

Substituting ($R_s$, $B_s$, $G_s$) into equation (1) (assuming G1=G2=$G_s$) gives a value for Y and C at pixel 52. Similarly, using values of $\alpha_B$, $\alpha_R$ enables values of Y and C to be made for other pixels in region 48.

In document imaging, it is typical that substantially all regions in the document are classifiable as having one of two colors predominating in the document, termed herein a background color and a non-background color. For example, document 46 may comprise black text on a white background, or a red line drawing on a pale yellow background. Preferred embodiments of the present invention are able to function with an image comprised of substantially any pair of colors. Hereinbelow, signals from the background color are identified with a subscript "b," and signals from the non-background color are identified with a subscript "n."

In a region which is known to be predominantly background, ratios comprising red signals ($R_b$), green signals ($G_b$), and blue signals ($B_b$) from their respective pixels will be substantially constant over the region. Thus a ratio $$\frac{B_b}{G_b}$$

has a substantially constant value, herein termed $\alpha_{Bb}$, and a ratio $$\frac{R_b}{G_b}$$

has a substantially constant value, herein termed $\alpha_{Rb}$, for signals from the background region. Similarly, in a region which is known to be predominantly non-background, ratios for red signals ($R_n$), green signals ($G_n$), and blue signals ($B_n$) will also be substantially constant. Thus there is a substantially constant value $\alpha_{Bn}$, equal to a ratio $$\frac{B_n}{G_n},$$

and a substantially constant value $\alpha_{Rn}$, equal to a ratio $$\frac{R_n}{G_n}$$

for signals from the non-background region.

Figure 5:
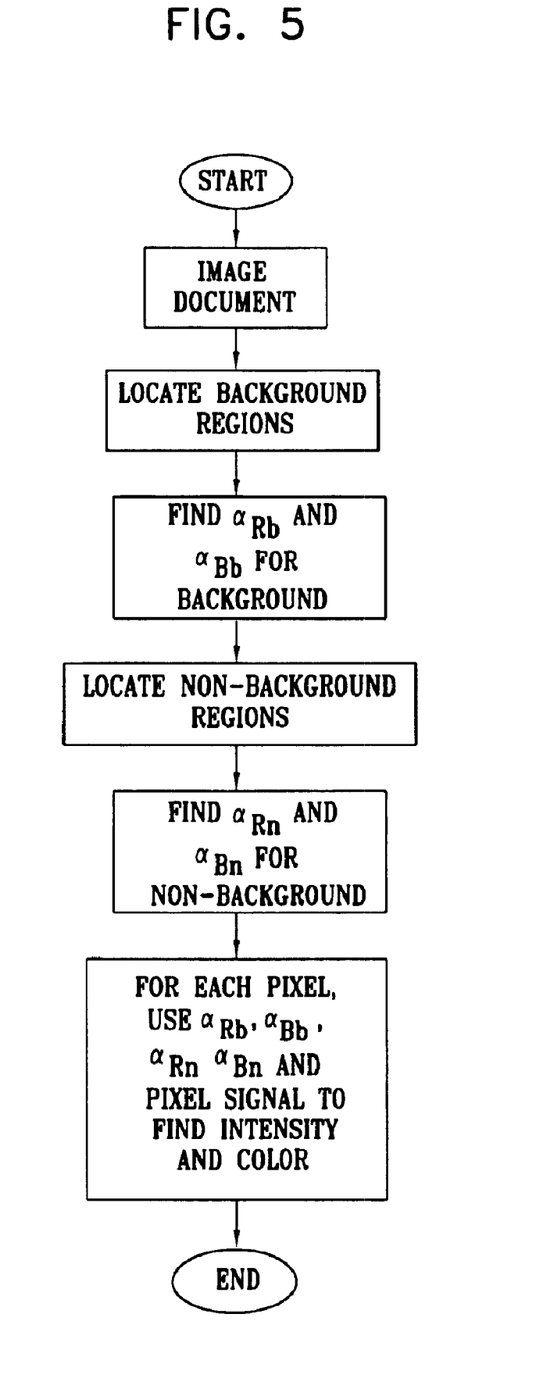
FIG. 5 is a flowchart illustrating a process for improving the resolution of an image captured in the imaging system of FIG. 4, according to a preferred embodiment of the present invention.

FIG. 5 is a flowchart illustrating a process for improving the resolution of an image captured in system 40, according to a preferred embodiment of the present invention. In an initial step, an image of document 46 is formed on sensor 44 of imaging system 40 (FIG. 4).

In a background analysis step, signals from pixels in sensor 44 are analyzed to determine one or more regions where the image comprises mainly background color. The analysis is most preferably implemented by finding regions where the change in signal level from a specific color (R, G, or B) pixel to a closest-neighbor same-color pixel is relatively low, indicating that the region being imaged comprises substantially one color. Averages, herein termed $\overline{R_b}$, $\overline{G_b}$, and $\overline{B_b}$, of all respective $R_b$, $G_b$, and $B_b$ signals within such a region are calculated. The averages are used to calculate background values of $\alpha_{Rb}$ and $\alpha_{Bb}$:

$$\alpha_{Rb} = \frac{\overline{R_b}}{\overline{G_b}}, \quad \alpha_{Bb} = \frac{\overline{B_b}}{\overline{G_b}} \tag{4}$$

In a non-background analysis step, signals from sensor 44 are analyzed in generally the same manner as described for the background analysis step. The non-background regions are chosen from substantially single-color regions which have significantly different signal values from those for pixels in the background regions. Averages, herein termed $\overline{R_n}$, $\overline{G_n}$, and $\overline{B_n}$, of all respective $R_n$, $G_n$, and $B_n$, signals within such a region are calculated. The averages are used to calculate non-background values of $\alpha_{Rn}$ and $\alpha_{Bn}$:

$$\alpha_{Rn} = \frac{\overline{R_n}}{\overline{G_n}}, \quad \alpha_{Bn} = \frac{\overline{B_n}}{\overline{G_n}} \tag{5}$$

In cases where non-background regions are not sufficiently large or well-defined, for example in the case when the non-background regions are text, most preferably vertical and horizontal parts of specific letters are used to calculate $\alpha_{Rn}$ and $\alpha_{Bn}$. Methods for determining such parts, for example by comparing orthogonal signal gradients, are well known in the art.

Each pixel of sensor 44 images a color which is substantially background, non-background, or a combination of background and non-background, and generates a signal "x." In a final step, signal x and values of $\alpha_{Rb}$, $\alpha_{Bb}$, $\alpha_{Rn}$, and $\alpha_{Bn}$ are used to generate an intensity and a color for each pixel. Most preferably, $\alpha_B$ and $\alpha_R$ for each pixel are calculated using a linear combination of $$\frac{\alpha_{Bb}}{\alpha_{Rb}} \text{ and } \frac{\alpha_{Bn}}{\alpha_{Rn}},$$

the linear combination being a function of how x compares to averaged background and non-background values for the specific pixel. These values are then used in equations (3) and (2), as necessary, in order to find values of R, G, and B to substitute into equation (1), and so find a value of Y and C for each pixel.

Figure 6:
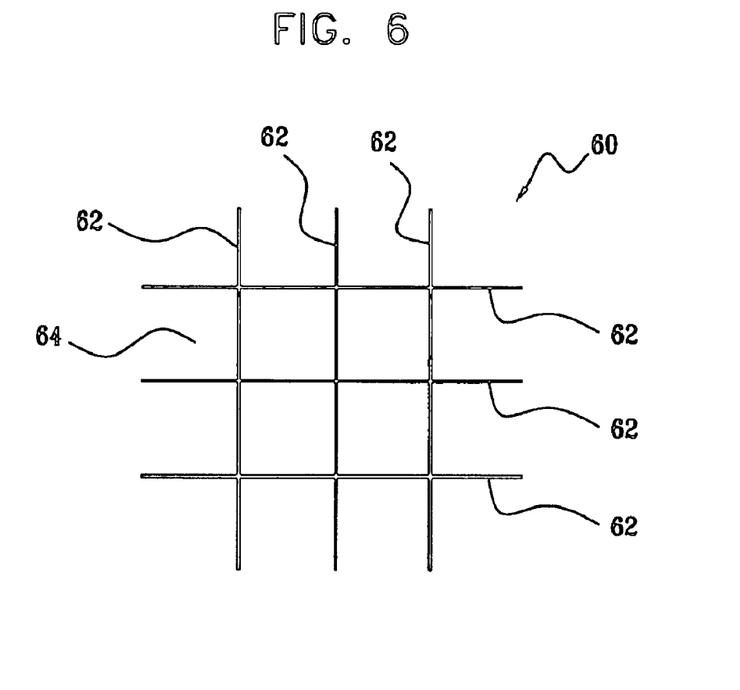
FIG. 6 is a schematic diagram of a calibration grid used in a process for reducing effects of lens aberrations, according to a preferred embodiment of the present invention.

FIG. 6 is a schematic diagram of a calibration grid 60 used in a process for reducing effects of lens aberrations, according to a preferred embodiment of the present invention. Grid 60 is most preferably implemented as a set of transparent horizontal and vertical lines 62 on a substantially opaque background 64, the lines forming a substantially square array. Lines 62 are most preferably blurred at their edges, so as to prevent, as explained in more detail below, aliasing of an image produced by grid 60. Grid 60 is dimensioned so that each of lines 62 forms an image more than two pixels wide on sensor 44, when the grid is positioned as object 46 in system 40 (FIG. 4). To image grid 60 on the sensor, the grid is most preferably illuminated by substantially white light.

Each color plane of sensor 44 is analyzed separately, to locate vertices in the image of the grid. The vertices are located by detecting vertical and horizontal line crossings. Thus, considering the blue plane, all blue pixels generating a signal above a predetermined level are analyzed. The pixels are allocated to a specific vertical and/or a specific horizontal line structure, by determining relationships between adjacent blue pixels, or by other means known in the art. A first order determination is made of a vertex as one or more adjacent blue pixels which have been allocated to both a vertical and a horizontal line structure. A more accurate determination of the position of the particular vertex is made by finding the point of intersection of the vertical and horizontal lines in the region of the first order vertex. Preferably, the coordinates of each vertex $(x_n, y_n)$ are determined by finding a weighted mean of signals B in the region of the vertex, according to the following equations:

$$x_n = \frac{\sum B \cdot x}{\sum B}, \quad y_n = \frac{\sum B \cdot y}{\sum B} \tag{6}$$

Aliasing in summations in equations (6) is substantially eliminated by the blurring of lines 62. Similar analyses are implemented for the red and green planes.

As explained in the Background of the Invention with reference to FIGS. 2 and 3, images formed by device 42, particularly when the device is a simple lens, will have chromatic aberrations. Thus, the location of any specific vertex, as determined by equations (6) for the three color planes, will generally be displaced one from the other. Typically the blue vertices will be displaced towards the center of the image, and the red vertices will be displaced away from the center of the image, relative to the green vertices. To compensate for the offset, correction factors are calculated for each red vertex and each blue vertex, as described herein.

The horizontal offset for each red vertex is assumed to be expressed as a two-dimensional second order polynomial, i.e., $$\Delta x_{R_n} = a_0 x_{R_n}^2 + a_1 y_{R_n}^2 + a_2 x_{R_n} y_{R_n} + a_3 x_{R_n} + a_4 y_{R_n} + a_5 \tag{7}$$

wherein $\Delta x_{R_n}$ is the offset, and $(x_{R_n}, y_{R_n})$ are the coordinates, of the nth red vertex, and $a_0, a_1, a_2, a_3, a_4, a_5$, are correction coefficients for sensor 44.

If grid 60 is assumed to comprise L vertices, there will thus be L simultaneous equations (2) with six unknowns. The L equations may be written in matrix format:

$$\Delta X_{R_n} = X_{R_n} \cdot a \tag{8}$$

The equations are used to evaluate values for $a_0$, $a_1$, $a_2$, $a_3$, $a_4$, and $a_5$, preferably by a method of least squares fitting, or alternatively by some other standard method known in the art for solving simultaneous equations. The values of $a_0$, $a_1$, $a_2$, $a_3$, $a_4$, and $a_5$ are then stored in CPU 54. A similar process to that described above is implemented in order to find corresponding correction coefficients for second-order polynomials for the vertical offset of each red vertex. The process is also implemented for the horizontal and vertical offsets of each blue vertex, so that a total of 24 correction coefficients are generated and stored in CPU 54. These coefficients are used, as described hereinbelow, to improve the color balance of an image formed on sensor 44.

Figure 7:
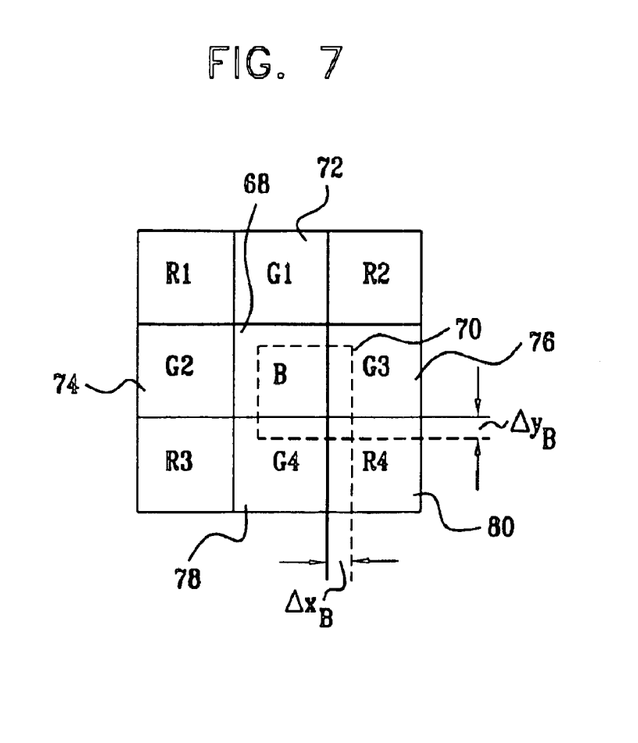
FIG. 7 is a schematic diagram showing an offset image, according to a preferred embodiment of the present invention.

FIG. 7 is a schematic diagram showing an offset image 70, according to a preferred embodiment of the present invention. Image 70 on a blue pixel 68 is offset from the pixel because of distortions which are introduced by imaging system 40. Image 70 is offset horizontally by $\Delta x_B$ and vertically by $\Delta y_B$. Thus the signal B generated by pixel 68, and the corresponding green value G(B) based on B, due to image 70, is reduced. A corrected value G(Bcor) of signal G(B) is preferably calculated as follows:

$$G(B_{cor}) = \frac{\Delta y_B \cdot G1 + \Delta x_B \cdot G2 + G(B)}{\Delta y_B + \Delta x_B + 1} \qquad (9)$$

wherein G1, G2, and G(B) correspond to respective signals, generated at pixels 72, 74, and 68, which have been corrected according to equations (1), (2), and (3) as described above.

Equation (9) is generated as one possible form of a linear interpolation using signal values at pixels 72, 74 and 68. Equation (9) assumes that only nearest-neighbor vertical and horizontal pixels to pixel 68 have a substantial effect on signal B.

Alternatively, a corrected value $G(B_{cor})$ is calculated as follows:

$$G(B_{cor}) = \frac{G(B) - \Delta x_B(1 - \Delta y_B)G3 - \Delta y_B(1 - \Delta x_B)G4 - \Delta x_B \Delta y_B G(R4)}{(1 - \Delta x_B)(1 - \Delta y_B)} \qquad (10)$$

wherein G3, G4, and G(R4) correspond to respective signals, generated at pixels 76, 78, and 80, which have been corrected according to equations (1), (2), and (3) as described above.

Equation (10) is a linear interpolation of signal values from all nearest-neighbor pixels which receive energy because of the offset of image 70.

Values of $\Delta x_B$, $\Delta y_B$ for pixel 70 are calculated from the "blue" correction coefficients, determined as described above with reference to FIG. 6, stored in CPU 54. A similar process is applied to generate corrected signals for the other blue pixels, and for the red pixels, of sensor 44, using the appropriate correction coefficients in each case, so as to improve overall image color balance produced by the sensor.

In some preferred embodiments of the present invention, the image quality is further improved by enhancing edges of the image. Edges are determined by considering gradients of specific color plane pixels. For example, if a pixel is found to be substantially in alignment with an edge, its contribution to equations (9) and (10) is enhanced. If the pixel is substantially orthogonal to the edge, its contribution to the equations is reduced. Methods for determining edges of images are well known in the art.

Figure 8:
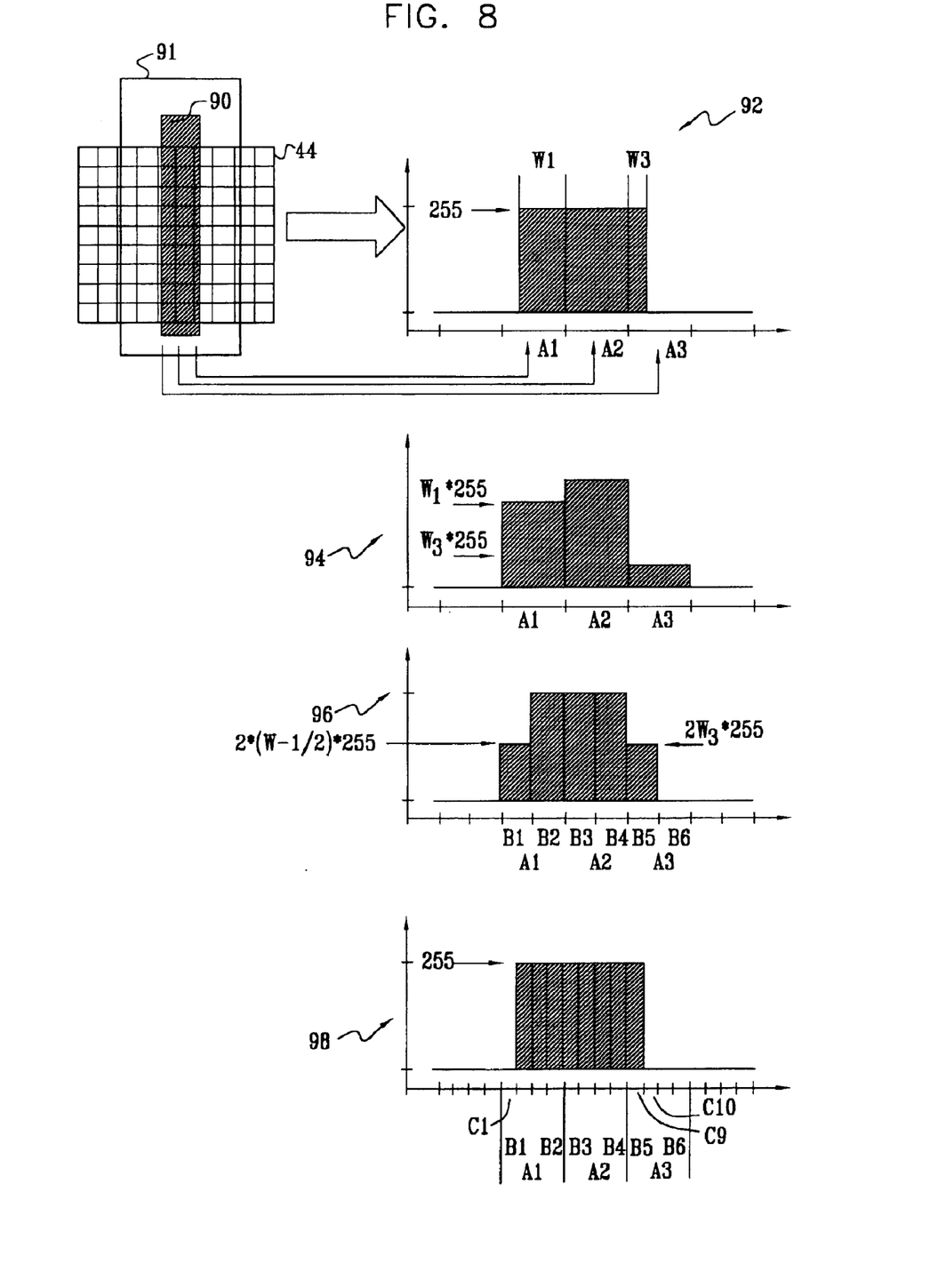
FIG. 8 is a schematic diagram illustrating generation of an image at sub-pixel resolution, according to a preferred embodiment of the present invention.

FIG. 8 is a schematic diagram illustrating an image which is generated to sub-pixel resolution, according to a preferred embodiment of the present invention. A vertical line 90, having a width of 2 pixels and having a non-background color, is imaged onto sensor 44. Line 90 is assumed to be aligned with a vertical axis of the sensor. Line 90 is part of an image 91, substantially comprised of non-background and background colors. A pixel which completely images non-background color is assumed to generate a signal equal to 255. A pixel which completely images background color is assumed to generate a signal equal to 0. An ideal output from three pixels A1, A2, and A3 is shown in a graph 92, wherein a width of pixel A1 is $W_1$, and a width of pixel A3 is $W_3$, where $W_1$ and $W_3$ are fractions of a width of a pixel in sensor 44. It is assumed that $W_1 > 0.5$, and that $W_3 < 0.5$. An actual output from the three pixels A1, A2, and A3 is shown in a graph 94.

A graph 96 shows the effect of doubling the pixel resolution to sub-pixels B1, B2, ..., B6. The signal from pixel A1 is divided into two, a first signal at sub-pixel B2, closest to the known non-background value of A2, having a value 255, and a second signal at sub-pixel B1 having a value $2*(W_1-0.5)*255$. Similarly, the signal from pixel A3 is divided into two, a first signal at sub-pixel B5, closest to the known non-background value of A2, having a value $2*W_3*255$, and a second signal at sub-pixel B6 having a value 0.

A graph 98 shows the effect of further doubling the pixel resolution to sub-pixels C1, C2, ..., C10, and allocating the signal of each sub-pixel to be either 255 or 0, depending on which value is closest after the doubling process. Thus, sub-pixel B1 is split into a sub-pixel C2 having a signal 255, and a sub-pixel C1 having a signal 0, assuming that $$\frac{160}{255} < W_1 < \frac{224}{255}.$$

Similarly sub-pixel B5 is split into a sub-pixel C9 having a signal 255, and a sub-pixel C10 having a signal 0, assuming that $$\frac{32}{255} < W_3 < \frac{96}{255}.$$

The process illustrated in FIG. 8 is theoretical, and has assumed that line 90 is aligned with an axis of sensor 44. In practice, a line that is imaged on sensor 44 will in general not be so aligned. Also in practice, imaging system 40 (FIG. 4) spreads the image of each point of object 46, according to a point spread function, as is known in the art (the spreading function is typically dependent on properties of imaging device 42, such as an effective aperture of the device). Furthermore, object 46 is typically not only comprised of lines such as line 90. The method described hereinbelow, with reference to FIG. 9, substantially resolves these limitations.

Figure 9:
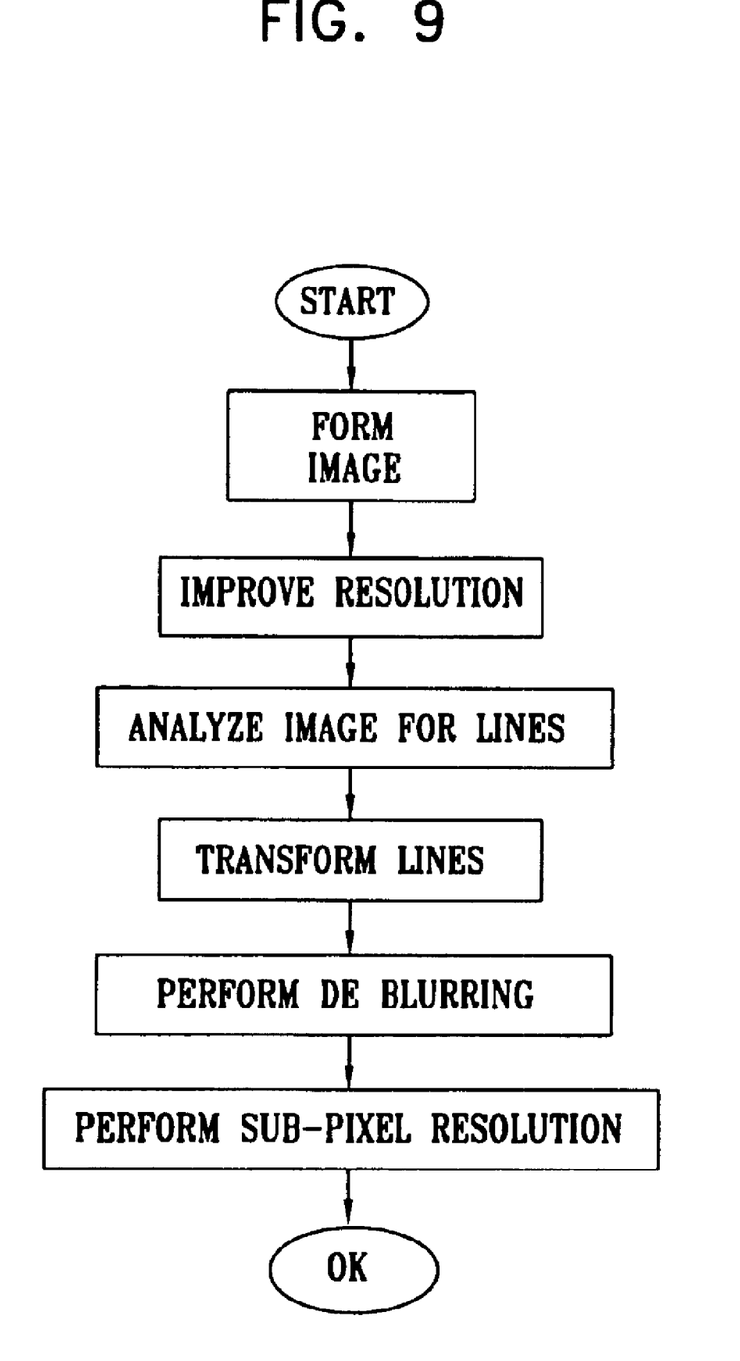
FIG. 9 is a flowchart showing a method for generating sub-pixel resolution, according to a preferred embodiment of the present invention.

FIG. 9 is a flowchart showing a method for generating sub-pixel resolution, according to a preferred embodiment of the present invention. The method shown in FIG. 9 implements the process described above with reference to FIG. 8. In initial steps, an image is formed on sensor 44, and an image resolution improvement process, substantially as described above with reference to FIG. 5, is performed. The image is assumed to be implemented substantially from two colors, and elements of the image which are to have their resolution increased are assumed to comprise substantially linear elements.

In an analysis step, the image is analyzed for single straight line segments formed from pixels having a non-background color, by methods known in the art. Typically, line segments found will not be aligned with an axis of the sensor. In these cases, a linear transformation of pixels comprising each segment, and of pixels in the region of each respective segment, is performed. For each segment, the transformation is performed so as to generate a set of equivalent pixel values on a grid having an axis perpendicular to the respective line. Such linear transformations are well known in the art.

Regions which have been found to comprise single straight line segments are then deblurred, using one of the deblurring algorithms known in the art. The specific deblurring algorithm generates deblurred pixels.

After necessary transformations and deblurring, a process of sub-pixel resolution substantially similar to the process described above with reference to FIG. 8 is performed on each region of deblurred pixels.

It will be appreciated that other methods for generating sub-pixel resolution are known in the art. Such methods are most preferably implemented using preferred embodiments of the present invention as described hereinabove. It will also be appreciated that during the correction process described hereinabove with reference to FIG. 7, a pixel-sized image is offset and so overlaps more than one pixel. These pixels are analyzed more than once, according to the colors of adjacent pixels. For example, information regarding pixel G3 can be found from G3 itself and from the overlap of pixel B on G3. Those skilled in the art will be able to correlate these analyses to further increase the resolution of sensor 44.

Figure 10:
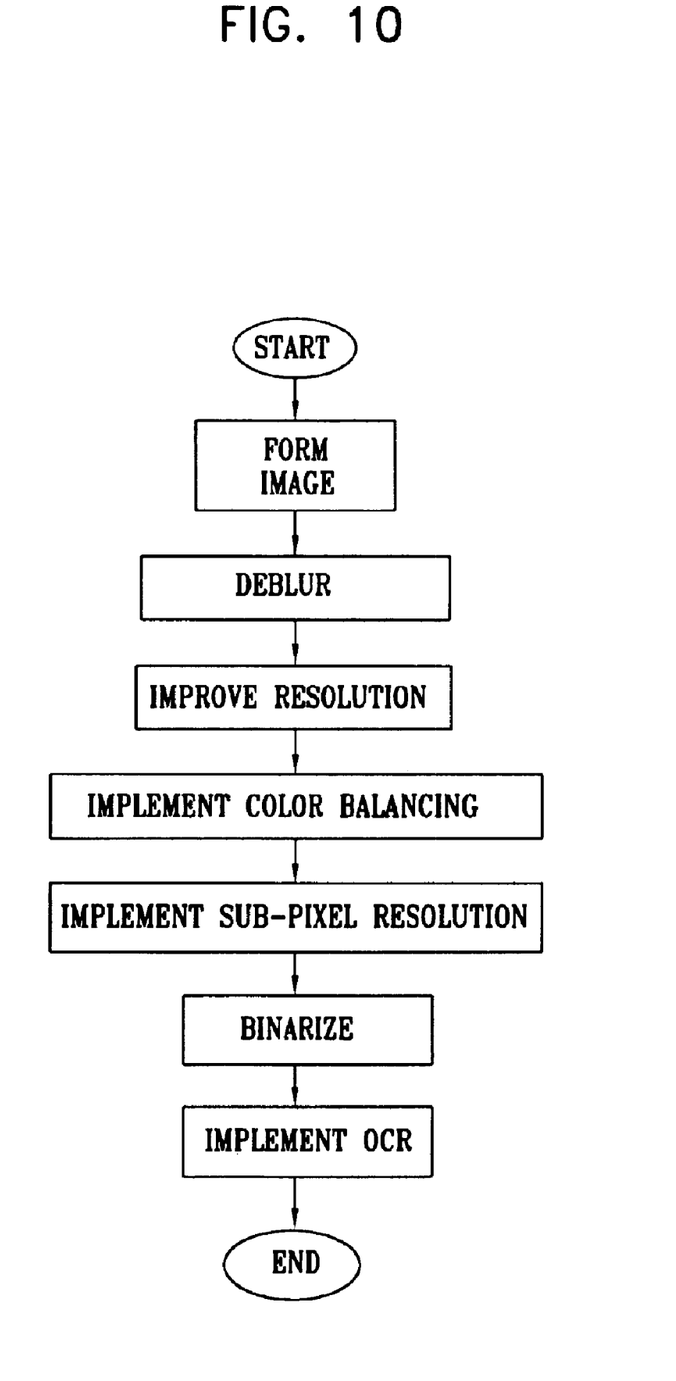
FIG. 10 is a flowchart showing a method for optical character recognition (OCR), according to a preferred embodiment of the present invention.

FIG. 10 is a flowchart showing a method for optical character recognition (OCR), according to a preferred embodiment of the present invention. As is known in the art, OCR systems use a system of binarization of an image before processing the image to derive text. The OCR system performance is very sensitive to the binarization process used. The flowchart described herein uses gray level information and knowledge of adjacent pixel interrelationships generated by sensor 44, together with a knowledge of the point spread function of imaging device 42, to improve OCR.

In a first step, an image comprising text is formed on sensor 44. Most preferably, the image is deblurred using one of the deblurring algorithms known in the art. The image is then processed substantially according to the method described hereinabove with reference to FIG. 5, in order to improve the resolution of the image. The improved image is then processed substantially according to the methods described hereinabove with reference to FIGS. 7, 8 and 9, to improve image color balance, and to resolve the image to sub-pixel resolution. Finally, the image is binarized and subjected to an OCR process known in the art.

Referring back to FIGS. 4 and 5, in some preferred embodiments of the present invention the process of FIG. 5 is adapted to restore delicate lines in an image. If image 50 comprises fine lines having the non-background color on the background color, the fine lines may be initially undetected because pixels comprising the fine lines are assumed to be part of the background. However, once the non-background color has been determined, a later analysis can restore the fine lines by "forcing" the color. For example, assume the non-background color has been determined to be cyan, $$\left(\frac{B+G}{2}\right).$$

A green pixel which initially does not appear to be cyan, but which has adjacent blue pixels which are cyan, may be designated as being color cyan. The signal of the green pixel is altered accordingly. Forcing a color to a non-background pixel (according to its relevant neighbors) helps restore the line, and also prevents color artifacts that normally characterize images of lines taken by a mosaic sensor.

In some preferred embodiments of the present invention, system 40 is adapted to be used as facsimile machine. Most preferably, one or more of the methods described hereinabove for improving image quality of sensor 44 are implemented so as to improve the quality of fax images transmitted by the machine. Similarly, system 40 can be adapted as a business card reader, preferably comprising OCR, so that the image and/or data related to a business card can be read and stored in a database. In some preferred embodiments of the present invention, system 40, together with OCR, is used as a document or phrase or word translator, using automatic or semi-automatic translation methods known in the art.

In some preferred embodiments of the present invention, system 40 is adapted for use as a barcode reader, most preferably by further implementing the sub-pixel resolution improvement described above with reference to FIG. 8.

In some preferred embodiments of the present invention, most preferably when the object being imaged comprises text, system 40 is used as an image data compression device. The object comprising text is first imaged, and the image is processed via OCR to generate text. The text is transmitted or stored as is, and, if appropriate, is further processed via a text compression method known in the art. If a grayscale object is found in the object, the image is preferably compressed to a binary level by one of the processes known in the art, such as dithering or half-toning.

In some preferred embodiments of the present invention, system 40 is adapted to be able to operate either as a full-color imaging system, i.e., without implementing the resolution improvement methods described hereinabove, or as one or more of the resolution improvement systems described hereinabove.

It will be appreciated that preferred embodiments of the present invention are able to function with an image comprised of more than one area, each area being comprised of a pair of colors generally different from pairs of colors of other areas of the image. For example, a document which is imaged may be comprised of a first area having black text on a white background, and a second area having a blue line drawing on a yellow background. After determining the first and second areas, by methods known in the art, each area may be operated on in a generally independent manner, as described hereinabove.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for electronic imaging, comprising:
   forming an image of a pattern comprising a background color and a non-background color on a plurality of pixels in a color mosaic image sensor; in which each pixel has a filter of a respective color associated therewith;
   receiving from each of the plurality of pixels a respective initial signal responsive to the image;

determining the background color of the image;

determining the non-background color of the image; and calculating an adjusted signal for each pixel of the plurality of pixels responsive to the initial signal of the pixel and to at least one of the background color and the non-background color and at the respective color of the filter associated with the pixel.

2. A method according to claim 1, wherein the color mosaic sensor comprises pixels of at least two specific colors, and wherein determining the background color comprises locating a background region of the image responsive to the initial signals of the pixels of at least one of the specific colors, and wherein determining the non-background color comprises locating a non-background region of the image responsive to the initial signals of the pixels of the at least one of the specific colors.

3. A method according to claim 2, wherein determining the background color comprises determining one or more background values responsive to the initial signals of the pixels of the at least two specific colors in the background region, and wherein determining the non-background color comprises determining one or more non-background values responsive to the initial signals of the pixels of the at least two specific colors in the non-background region.

4. A method according to claim 3, wherein calculating the adjusted signal for each pixel comprises determining the adjusted signal responsive to the one or more background values and the one or more non-background values.

5. A method according to claim 1, wherein forming the image comprises forming a calibration image on the color mosaic image sensor, and wherein calculating the adjusted signal for each pixel comprises determining one or more correction factors for the sensor responsive to the calibration image and calculating a corrected value for each pixel responsive to the one or more correction factors.

6. A method according to claim 1, wherein calculating the adjusted signal for each pixel comprises calculating a plurality of sub-pixel resolution signals for each pixel responsive to a level of the initial signal of the pixel.

7. A method according to claim 6, wherein calculating the plurality of sub-pixel resolution signals comprises identifying one or more straight line segments within the image.

8. A method according to claim 1, wherein calculating the adjusted signal for each pixel comprises implementing a process of binarization of the image and utilizing the binarization to perform optical character recognition (OCR) on at least a portion of the image.

9. A method for electronic imaging, comprising:

forming an image of a pattern comprising a first plurality of areas, each area comprising a respective background color and a respective non-background color, on a second plurality of pixels in a color mosaic image sensor, in which each pixel has a filter of a respective color associated therewith;

receiving from each of the second plurality of pixels a respective initial signal responsive to the image;

determining which of the second plurality of pixels correspond to each area responsive to the background color and non-background color of each area;

determining for each area the respective background color of the image;

determining for each area the respective non-background color of the image; and calculating an adjusted signal for each pixel of the second plurality of pixels responsive to the initial signal of the pixel and to at least one of the background colors and the non-background colors of the area in which the pixel is located and to the respective color of the filter associated with the pixel.

10. Apparatus for electronic imaging, comprising:

a color mosaic image sensor comprising a plurality of pixels, which are adapted to generate respective initial signals responsive to an image formed thereon and in which each pixel has a filter of a respective color associated therewith; and a central processing unit (CPU), coupled to receive the respective initial signals from the plurality of pixels and, responsive to the initial signals, to determine a background color and a non-background color of the image and to calculate, for each of the plurality of pixels, an adjusted signal responsive to the initial signal and to at least one of the background color and the non-background color and to the respective color of the filter associated with the pixel.

11. Apparatus according to claim 10, wherein the plurality of pixels comprise pixels of at least two specific colors, and wherein the CPU locates a background region and a non-background region of the image responsive to the initial signals of the pixels of at least one of the specific colors.

12. Apparatus according to claim 11, wherein the CPU determines one or more background values responsive to the initial signals of the pixels of the at least two specific colors in the background region, and determines one or more non-background values responsive to the initial signals of the pixels of the at least two specific colors in the non-background region.

13. Apparatus according to claim 12, wherein the CPU determines the adjusted signal responsive to the one or more background values and the one or more non-background values.

14. Apparatus according to claim 10, and comprising a calibration grid which forms a calibration image on the color mosaic image sensor, and wherein the CPU determines one or more correction factors for the sensor responsive to the calibration image and calculates a corrected value for each pixel responsive to the one or more correction factors.

15. Apparatus according to claim 10, wherein the CPU calculates a plurality of sub-pixel resolution signals for each pixel responsive to a level of the initial signal of the pixel.

16. Apparatus according to claim 15, wherein the CPU determines one or more straight line segments within the image.

17. Apparatus according to claim 10, wherein the CPU implements a process of binarization of the image and utilizes the binarization to perform optical character recognition (OCR) on at least a portion of the image.

18. Apparatus for electronic imaging, comprising:

a color mosaic image sensor comprising a first plurality of pixels, which are adapted to generate respective initial signals responsive to an image and in which each pixel has a filter of a respective color associated therewith, the image comprising a second plurality of areas, each area comprising a respective background color and a respective non-background color, formed thereon; and a central processing unit (CPU), coupled to receive the respective initial signals from the first plurality of pixels and which is adapted, responsive to the initial signals, to determine which of the pixels correspond to each area responsive to the background color and non-background color of each area, to determine for each area a background color and a non-background color of the image, and to calculate, for each of the first plurality of pixels, an adjusted signal responsive to the initial signal and to at least one of the background colors and the non-background colors of the area in which the pixel is located and to the respective color of the filter associated with the pixel.

19. A method according to claim 1, wherein calculating the adjusted signal comprises, for each of at least some of the pixels:

determining a first relation between the respective color of the filter and the background color;

determining a second relation between the respective color of the filter and the non-background color; and applying at least one of the first and second relations to the initial signal in order to calculate the adjusted signal.

20. A method according to claim 19, wherein applying the at least one of the first and second relations comprises determining a respective correction for each of the at least some of the pixels based on the at least one of the first and second relations, and applying the respective correction to each of the at least some of the pixels individually in order to determine the adjusted signal.

21. Apparatus according to claim 10, wherein the CPU is adapted to calculating the adjusted signal comprises, for each of at least some of the pixels, by determining a first relation between the respective color of the filter and the background color, determining a second relation between the respective color of the filter and the non-background color, and applying at least one of the first and second relations to the initial signal in order to calculate the adjusted signal.

22. Apparatus according to claim 21, wherein the CPU is adapted to calculate the adjusted signal by determining a respective correction for each of the at least some of the pixels based on the at least one of the first and second relations, and applying the respective correction individually to the initial signal received from each of the at least some of the pixels.

* * * * *

UNITED STATES PATENT AND TRADEMARK OFFICE
CERTIFICATE OF CORRECTION

PATENT NO. : 6,876,763 B2
DATED : April 5, 2005
INVENTOR(S) : Noam Sorek et al.

It is certified that error appears in the above-identified patent and that said Letters Patent is hereby corrected as shown below:

Column 13,
Line 6, after "non-background color and" please delete "at" and insert -- to -- in its place.

Signed and Sealed this

Sixteenth Day of August, 2005

JON W. DUDAS
*Director of the United States Patent and Trademark Office*